US010681409B2

(12) United States Patent
Chen

(10) Patent No.: US 10,681,409 B2
(45) Date of Patent: *Jun. 9, 2020

(54) SELECTIVE ORIENTATION DURING PRESENTATION OF A MULTIDIRECTIONAL VIDEO

(71) Applicant: Oath Inc., Sunnyvale, CA (US)

(72) Inventor: Chien Hung Chen, Taipei (TW)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,495

(22) Filed: Apr. 8, 2019

(65) Prior Publication Data

US 2019/0238932 A1  Aug. 1, 2019

Related U.S. Application Data

(63) Continuation of application No. 15/660,137, filed on Jul. 26, 2017, now Pat. No. 10,257,568.

(51) Int. Cl.

| | |
|---|---|
| *H04N 21/44* | (2011.01) |
| *G06K 9/00* | (2006.01) |
| *G06K 9/32* | (2006.01) |
| *G06K 9/62* | (2006.01) |
| *H04N 21/438* | (2011.01) |
| *H04N 21/81* | (2011.01) |

(52) U.S. Cl.
CPC ... *H04N 21/44008* (2013.01); *G06K 9/00302* (2013.01); *G06K 9/00765* (2013.01); *G06K 9/3208* (2013.01); *G06K 9/623* (2013.01); *H04N 21/438* (2013.01); *H04N 21/816* (2013.01)

(58) Field of Classification Search
CPC ........... H04N 21/44008; H04N 21/438; H04N 21/816; G06K 9/00302; G06K 9/00765; G06K 9/3208; G06K 9/623
See application file for complete search history.

(56) References Cited

U.S. PATENT DOCUMENTS

| | | | |
|---|---|---|---|
| 2014/0245367 A1* | 8/2014 | Sasaki | H04N 21/4402 725/109 |
| 2018/0063461 A1* | 3/2018 | Kim | G09G 3/001 |

* cited by examiner

*Primary Examiner* — John R Schnurr
(74) *Attorney, Agent, or Firm* — Cooper Legal Group, LLC

(57) ABSTRACT

One or more computing devices, systems, and/or methods for selective orientation during presentation of a multidirectional video are provided. In an example, a multidirectional video may be received. A first orientation of a portion of the multidirectional video may be analyzed to determine a first score. A second orientation of the portion of the multidirectional video may be analyzed to determine a second score. Responsive to determining that the first score is greater than the second score, the first orientation may be selected in association with the portion of the multidirectional video. Responsive to receiving a request to view the multidirectional video, an indication of the first orientation as a representation of the portion may be provided.

20 Claims, 13 Drawing Sheets

SELECTIVE ORIENTATION DURING PRESENTATION OF A MULTIDIRECTIONAL VIDEO

CROSS REFERENCE TO RELATED APPLICATION

This application claims priority to and is a continuation of U.S. application Ser. No. 15/660,137, filed on Jul. 26, 2017, entitled "SELECTIVE ORIENTATION DURING PRESENTATION OF A MULTIDIRECTIONAL VIDEO", which is incorporated herein.

BACKGROUND

Many devices, such as mobile phones, tablets, laptops, mp4 players and/or desktop computers, provide for playing a video by accessing a video file. The video may include images captured from one or more perspectives. Sometimes, a device screen being used to display the video may be limited in size, and may not be able to simultaneously display at least some of one or more perspectives included in the video. For example, merely part of the images corresponding to an instant of the video may be watched at a time.

SUMMARY

In accordance with the present disclosure, one or more computing devices and/or methods for selective orientation during presentation of a multidirectional video are provided. In an example, a multidirectional video may be received (e.g., from a user of a video sharing platform). The multidirectional video may be segmented into at least a first portion (e.g., a 5 second segment) and a second portion (e.g., a 5 second segment). A first orientation (e.g., corresponding to a left side) of the first portion may be analyzed to determine a first score (e.g., corresponding to a level of importance, interest, etc. of the first orientation). A second orientation (e.g., corresponding to a right side) of the first portion may be analyzed to determine a second score (e.g., corresponding to a level of importance, interest, etc. of the second orientation). In response to determining that the first score is greater than the second score, the first orientation, but not the second orientation, may be selected in association with the first portion. For example, a determination may be made that the first orientation of the first portion has a higher level of importance than the second orientation of the first portion.

A third orientation (e.g., corresponding to a right side) of the second portion may be analyzed to determine a third score (e.g., corresponding to a level of importance, interest, etc. of the third orientation). A fourth orientation (e.g., corresponding to a left side) of the second portion may be analyzed to determine a fourth score (e.g., corresponding to a level of importance, interest, etc. of the fourth orientation). In response to determining that the third score is greater than the fourth score, the third orientation, but not the fourth orientation, may be selected in association with the second portion. For example, a determination may be made that the third orientation of the second portion has a higher level of importance than the fourth orientation of the second portion.

In response to receiving a request to view the multidirectional video (e.g., from a user of a video sharing platform), an indication of the first orientation may be provided as a representation of the first portion, and an indication of the third orientation may be provided as a representation of the second portion. For example, instructions may be provided to enable a device of the user to automatically adjust to the first (e.g., left) orientation while presenting the first portion and/or automatically adjust to the third (e.g., right) orientation while presenting the second portion. Alternatively and/or additionally, instructions may be provided to display a guide (e.g., an arrow) indicating the first (e.g., left) orientation as being preferable while presenting the first portion and/or indicating the third (e.g., right) orientation as being preferable while presenting the second portion.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
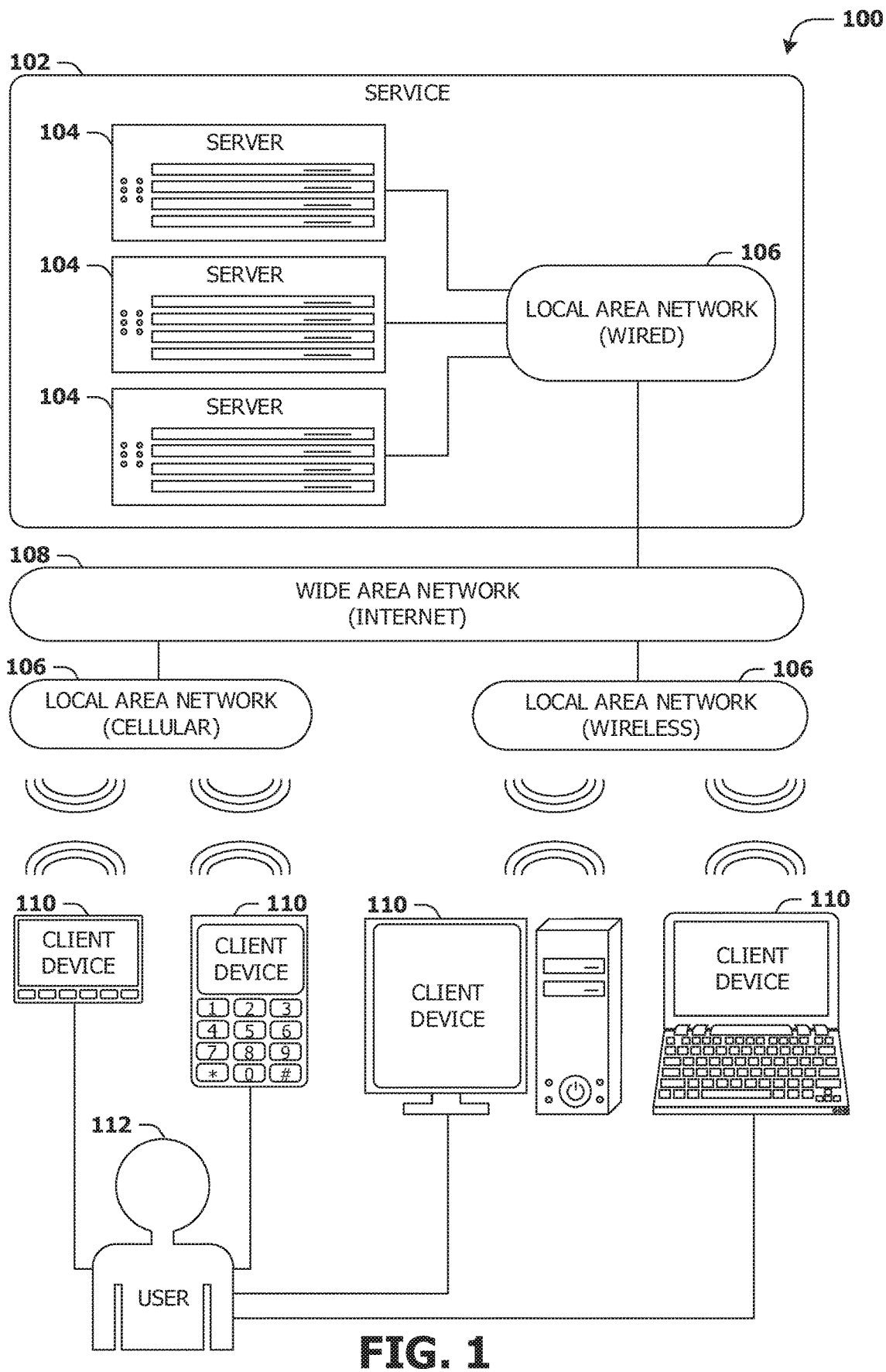
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a Wi-Fi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
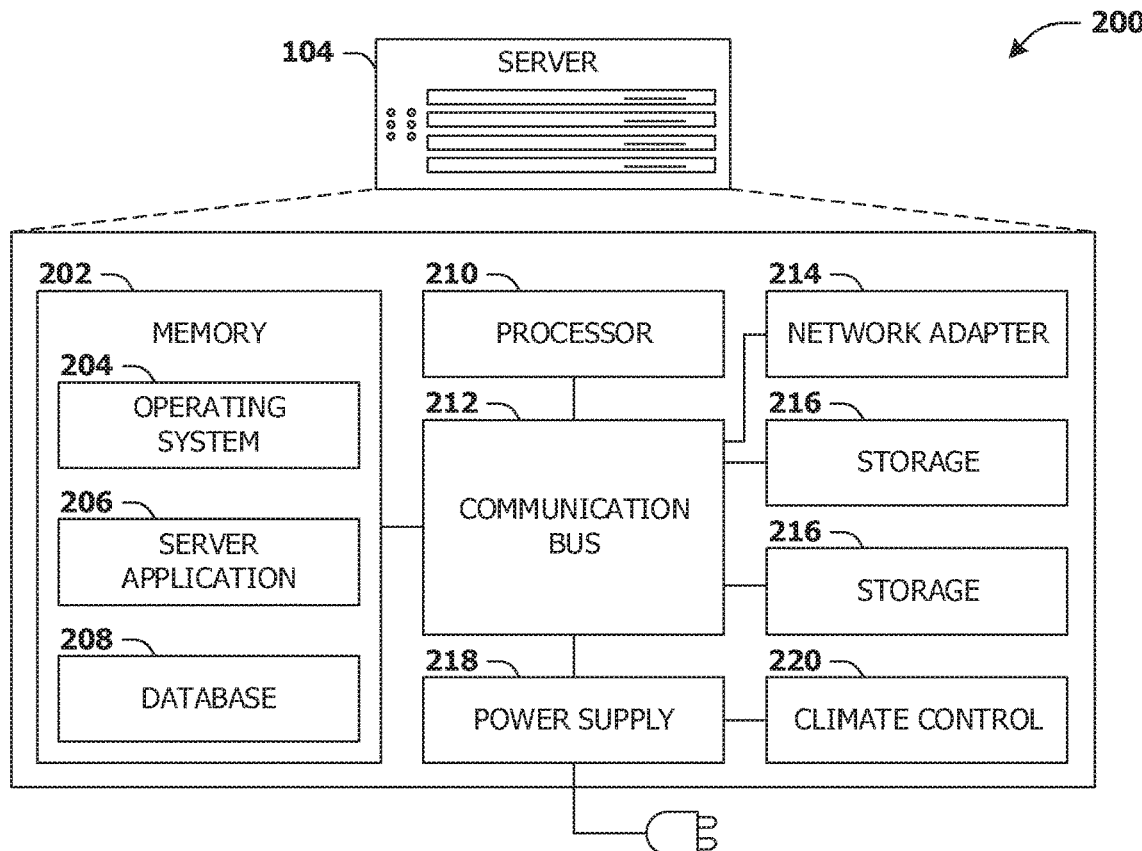
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
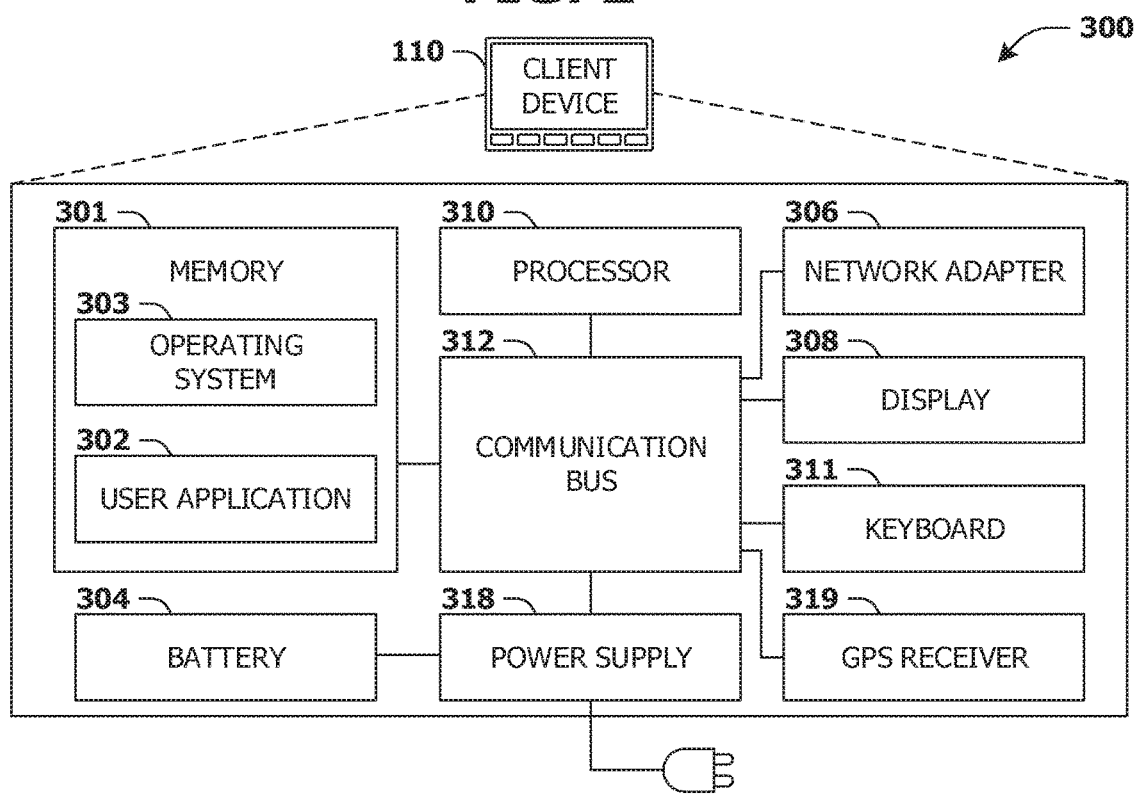
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for selective orientation during presentation of a multidirectional video are provided. Multidirectional videos, such as spherical (e.g., 360-degree and/or immersive) videos, may include images of one or more (e.g., more than one) direction at each instant of time, and may be shot using an omnidirectional camera and/or a plurality of cameras. The footage of the various directions may be stitched to form a single video (e.g., by a camera, using specialized video editing software, etc.). When the video is presented in a display window (e.g., accessed by a user), one or more of the directions captured in the video may be displayed in the display window (e.g., for viewing by the user) at a moment, while one or more other directions captured in the video may not be displayed in the display window (e.g., due to limited display space). A control may be used to adjust and/or select which portion of the video to display in the display window. For example, a left area of the control may be selected to adjust the display window from displaying a center of the video to displaying a left area of the video, and/or a right area of the control may be selected to adjust the display window from displaying the center of the video to displaying a right area of the video. However, at any moment, one area of the video may have more interesting and/or important content than one or more other areas. The user may thus risk missing interesting and/or important content by viewing a different area instead of the area with the interesting and/or important content. In such a scenario, having to replay one or more portions of the video may degrade the user's experience, waste (e.g., time, processing, memory, bandwidth, etc.) resources of the user and/or a server providing the video, etc. Thus, a means to present the area of the video with interesting and/or important content may be desirable, and in accordance with one or more of the techniques presented herein, video may be oriented in a manner that is efficient, convenient, effective and/or timely.

Figure 4A:
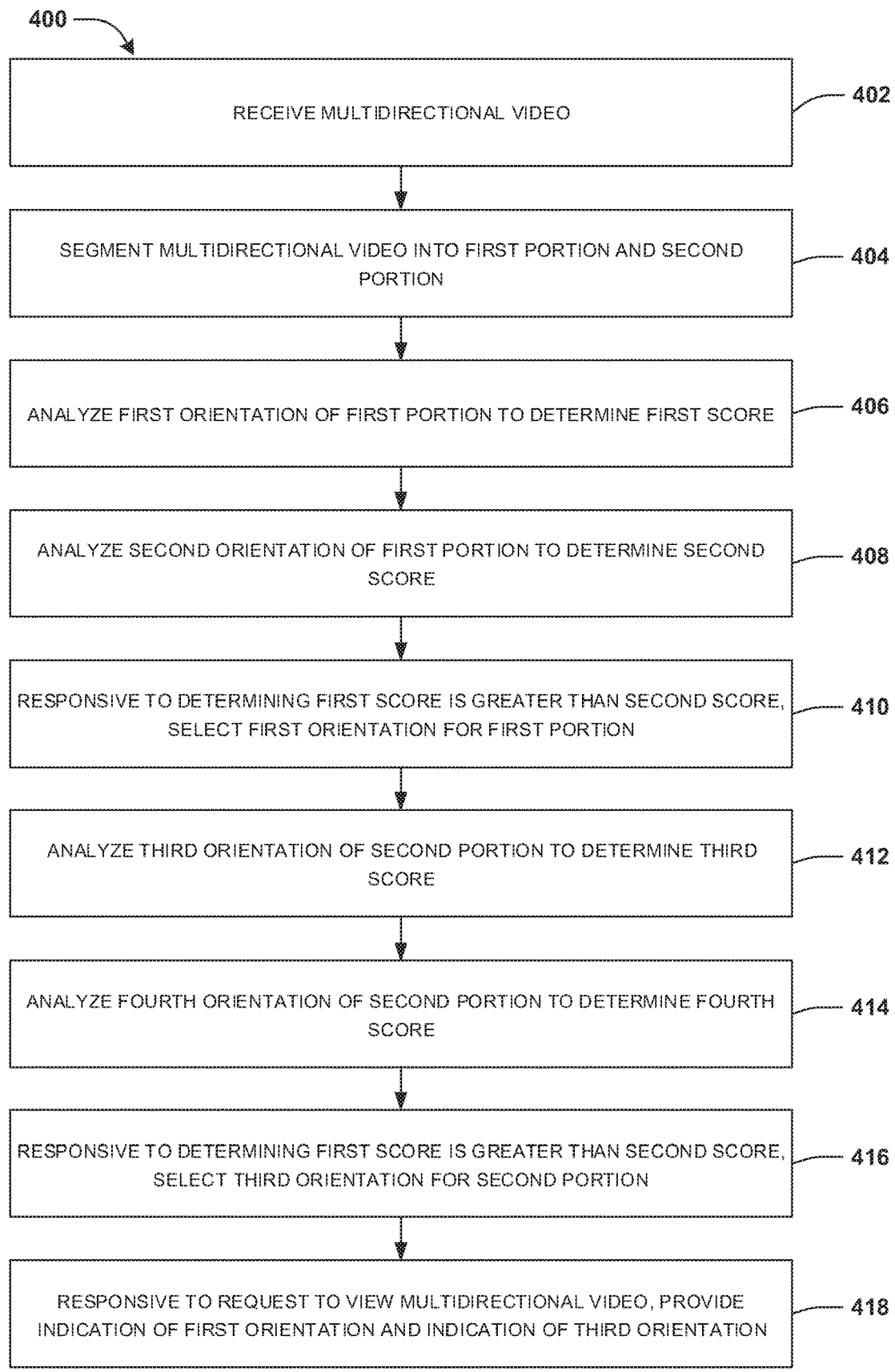
FIG. 4A is a flow chart illustrating an example method for selective orientation during presentation of a multidirectional video.

An embodiment of selective orientation during presentation of a multidirectional (e.g., 360-degree, spherical, immersive, etc.) video is illustrated by an example method 400 of FIG. 4A. A user, such as user Jill, (e.g., and/or a device associated with the user) may access and/or interact with a website, an application, etc. that provides a platform for uploading videos to a server (e.g., of the website, the application, etc.). The server may host uploaded videos, and the website may provide access to view the uploaded videos to an audience. Accordingly, at 402, a video may be received (e.g., by the server and/or from the user).

At 404, the video may be segmented into at least a first portion and a second portion. The first portion and the second portion may be of similar or equal length (e.g., or of different lengths). It may be appreciated that the video may be segmented into any number of portions, such as three, four, five, or five hundred, and that each of the portions may be of similar or equal length (e.g., or of different lengths). The number of portions for the video to be segmented into may be determined based upon a (e.g., default or user defined) desired length of each portion. Alternatively and/or additionally, the portions may be segmented based upon a determination of a transition, a common scene, etc.

Respective portions of the video may have one or more corresponding orientations (e.g., through which respective portions of the video may be viewed). For example, the first portion of the video may have a first orientation (e.g., focusing on a left area) at a first time (e.g., corresponding to a first timestamp, such as 5 minutes and 28 seconds after the start of the video), and the first portion may have a second orientation (e.g., focusing on a right area) at the (same) first time.

At 406, a first orientation (e.g., corresponding to an upper-left area of one or more frames of the video) of the first portion of the video may be analyzed to determine a first score. The first score may correspond to a level of importance, interest, action, etc. associated with the first orientation. For example, image processing may be performed on one or more images (e.g., frames) of the first orientation of the first portion to identify one or more regions of interest which may comprise objects, people, animals, buildings, emotions, etc. The first score may be calculated based upon the (e.g., number of) regions of interest identified. It may be appreciated that a weight may be associated (e.g., in a database) with a type of object in each region of interest, and that the corresponding weight(s) may be applied when calculating the first score.

For example, a first region of interest comprising a first car, a second region of interest comprising a first tree, and a third region of interest comprising a second tree may be identified in the first orientation of the first portion. A first weight of 0.8 may be retrieved from a database (e.g., in general, or based upon a profile (e.g., based upon behavior, interests, social media profile(s), etc.) of a user) for cars, and a second weight of 0.2 may be retrieved for trees. In the example, the first score may be calculated based upon (e.g., a combination of) a first object score calculated for the first car, a second object score calculated for the first tree and/or a third object score calculated for the second tree. The first object score may be calculated based upon (e.g., a combination of) the quantity of objects in the first region of interest (e.g., one) and the first weight (e.g., 0.8). The second object score may be calculated based upon (e.g., a combination of) the quantity of objects in the second region of interest (e.g., one) and the second weight (e.g., 0.2). The third object score may be calculated based upon (e.g., a combination of) the quantity of objects in the third region of interest (e.g., one) and the second weight (e.g., 0.2). For example, the first object score may be determined to be 1×0.8=0.8, the second object score may be determined to be 1×0.2=0.2, the third object score may be determined to be 1×0.2=0.2, and/or the first score may be determined to be 0.8+0.2+0.2=1.2.

At 408, a second orientation (e.g., corresponding to a lower-right area of one or more frames of the video) of the (e.g., same) first portion of the video may be analyzed to determine a second score. The second score may correspond to a level of importance, interest, action, etc. associated with the second orientation. For example, image processing may be performed on one or more images of the second orientation of the first portion to identify one or more regions of interest which may comprise objects, people, animals, buildings, emotions, etc. The second score may be calculated based upon the (e.g., number of) regions of interest identified. It may be appreciated that a weight may be associated (e.g., in a database) with a type of object in each region of interest, and that the corresponding weight(s) may be applied when calculating the second score.

At 410, in response to determining that the first score is greater than the second score, the first orientation may be selected in association with the first portion. For example, a determination may be made that the first orientation of the first portion has a greater number of regions of interest than the second orientation of the first portion, and therefore also has a higher level of importance, interest and/or urgency than the second orientation. Accordingly, an indication that the first orientation is a preferred and/or recommended orientation (e.g., over the second orientation and/or one or more other orientations) for the first portion of the video may be generated and/or stored in a video guidance database (e.g., for the user, for a group of users, for the public, etc.).

At 412, a third orientation (e.g., corresponding to an upper-right area of one or more frames of the video) of the second portion of the video may be analyzed to determine a third score. The third score may correspond to a level of importance, interest, action, etc. associated with the third orientation. For example, image processing may be performed on one or more images of the third orientation of the second portion to identify one or more regions of interest which may comprise objects, people, animals, buildings, emotions, etc. The third score may be calculated based upon the (e.g., number of) regions of interest identified. It may be appreciated that a weight may be associated (e.g., in a database) with a type of object in each region of interest, and that the corresponding weight(s) may be applied when calculating the third score.

At 414, a fourth orientation (e.g., corresponding to a lower-left area of one or more frames of the video) of the (e.g., same) second portion of the video may be analyzed to determine a fourth score. The fourth score may correspond to a level of importance, interest, action, etc. associated with the fourth orientation. For example, image processing may be performed on one or more images of the fourth orientation of the second portion to identify one or more regions of interest which may comprise objects, people, animals, buildings, emotions, etc. The fourth score may be calculated based upon the (e.g., number of) regions of interest identified. It may be appreciated that a weight may be associated (e.g., in a database) with a type of object in each region of interest, and that the corresponding weight(s) may be applied when calculating the fourth score.

At 416, in response to determining that the third score is greater than the fourth score, the third orientation may be selected in association with the second portion. For example, a determination may be made that the third orientation of the second portion has a greater number of regions of interest than the fourth orientation of the second portion, and therefore also has a higher level of importance, interest and/or urgency than the fourth orientation. Accordingly, an indication that the third orientation is a preferred and/or recommended orientation (e.g., over the fourth orientation and/or one or more other orientations) for the second portion of the video may be generated and/or stored in a video guidance database (e.g., for the user, for a group of users, for the public, etc.).

In some examples, the first portion of the video may include images and/or audio from the first time to a second time (e.g., corresponding to a second timestamp, such as 5 minutes and 58 seconds after the start of the video), the second portion of the video may include images and/or audio from a third time (e.g., corresponding to a third timestamp, such as 6 minutes and 5 seconds after the start of the video) to a fourth time (e.g., corresponding to a fourth timestamp, such as 6 minutes and 35 seconds after the start of the video), etc. A first (e.g., gradual) transition movement may be determined (e.g., calculated) for shifting from the first orientation (e.g., when presenting the first portion of the video) to the third orientation (e.g., when presenting the second portion of the video) (e.g., to avoid abrupt and/or choppy changes in orientation).

At 418, in response to receiving a request to view (e.g., at least some of) the multidirectional video (e.g., from one or more users of a video sharing platform), the indication of the first orientation (e.g., being the preferred and/or recommended orientation) as a representation of the first portion and/or the indication of the second orientation (e.g., being the preferred and/or recommended orientation) as a representation of the second portion may be provided (e.g., to a device of the user). In some examples, the indication of the first transition movement may (e.g., also) be provided with the indication of the first orientation and the indication of the second orientation.

For example, instructions may be provided to enable the device of the user to automatically adjust to the first orientation (e.g., corresponding to the upper-left area) while presenting the first portion and/or automatically adjust to the third orientation (e.g., corresponding to the upper-right area) while presenting the second portion. It may be appreciated that the automatic adjustments may be performed in response to receiving an activation (e.g., by the user) of a mechanism to automatically present preferred and/or recommended orientations while playing the video.

Alternatively and/or additionally, instructions may be provided to display a guide (e.g., an arrow) indicating the first (e.g., left) orientation as being preferable while presenting the first portion and/or indicating the third (e.g., right) orientation as being preferable while presenting the second portion. It may be appreciated that the user may use a control to (e.g., manually) adjust an active orientation of the video. Thus, the guide may be considered by the user when deciding a direction (e.g., and/or orientation) towards which to adjust.

Figure 4B:
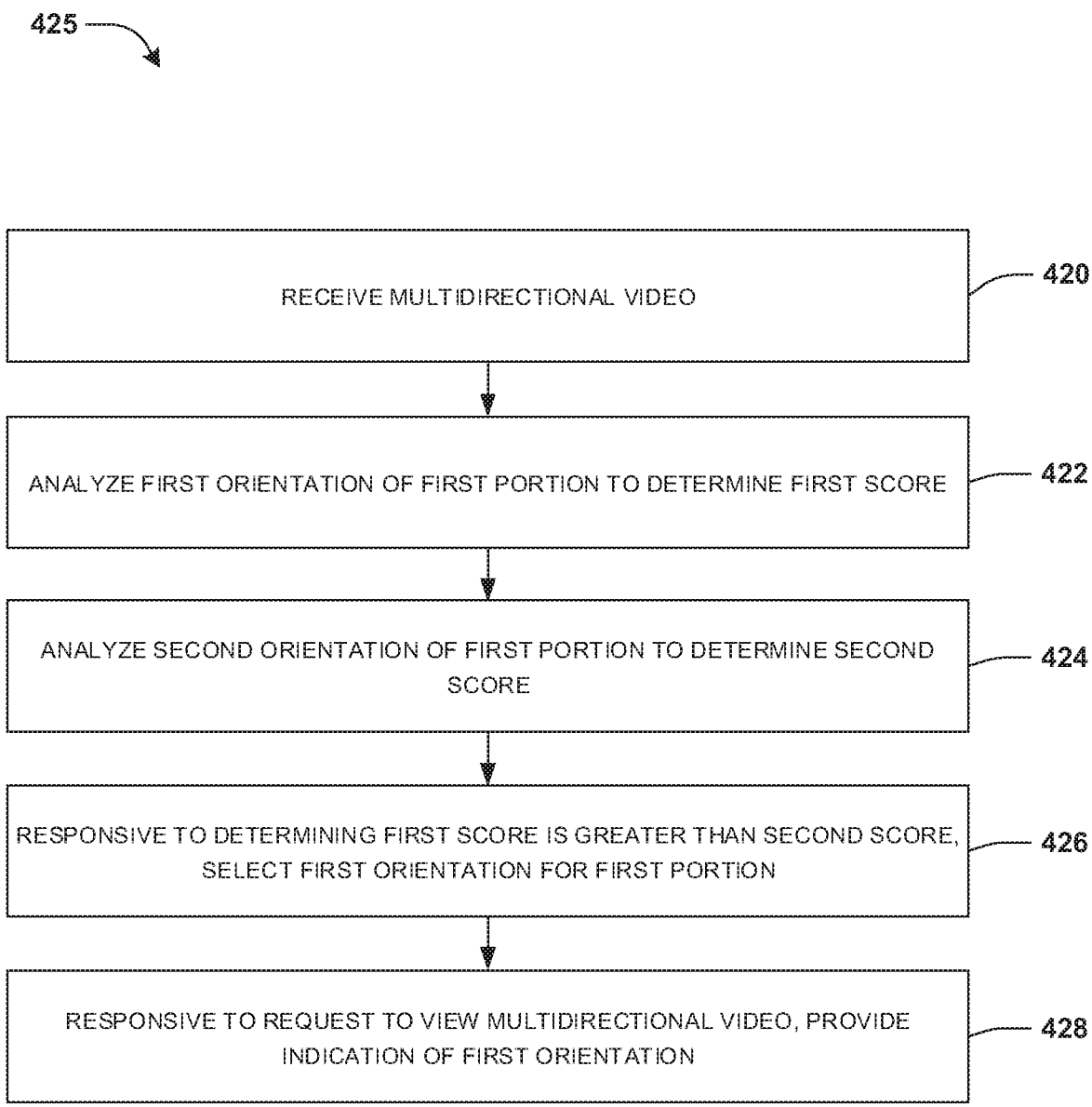
FIG. 4B is a flow chart illustrating an example method for selective orientation during presentation of a multidirectional video.

An embodiment of selective orientation during presentation of a multidirectional (e.g., 360-degree, spherical, immersive, etc.) video is illustrated by an example method 425 of FIG. 4B. A user, such as user Jill, (e.g., and/or a device associated with the user) may access and/or interact with a website, an application, etc. that provides a platform for uploading videos to a server (e.g., of the website, the application, etc.). The server may host uploaded videos, and the website may provide access to view the uploaded videos to an audience.

Accordingly, at 420, a video may be received (e.g., by the server and/or from the user). One or more portions of the video may have one or more corresponding orientations (e.g., through which respective portions of the video may be viewed at any given moment). For example, a first portion of the video may have a first orientation (e.g., focusing on a left area) at a first time (e.g., corresponding to a first timestamp, such as 28 minutes and 15 seconds after the start of the video), and the first portion may have one or more orientations (e.g., focusing on a right area, an upper area, a lower area, etc.) at the (same) first time.

At 422, a first orientation (e.g., corresponding to an upper-left area of one or more frames of the video) of the first portion of the video may be analyzed to determine a first score. The first score may correspond to a level of importance, interest, action, etc. associated with the first orientation. For example, image processing may be performed on one or more images of the first orientation of the first portion to identify one or more regions of interest which may comprise objects, people, animals, buildings, emotions, etc. The first score may be calculated based upon the (e.g., number of) regions of interest identified. It may be appreciated that a weight may be associated (e.g., in a database) with a type of object in each region of interest, and that the corresponding weight(s) may be applied when calculating the first score.

At 424, a second orientation (e.g., corresponding to a lower-right area of one or more frames of the video) of the (e.g., same) first portion of the video may be analyzed to determine a second score. The second score may correspond to a level of importance, interest, action, etc. associated with the second orientation. For example, image processing may be performed on one or more images of the second orientation of the first portion to identify one or more regions of interest which may comprise objects, people, animals, buildings, emotions, etc. The second score may be calculated based upon the (e.g., number of) regions of interest identified. It may be appreciated that a weight may be associated (e.g., in a database) with a type of object in each region of interest, and that the corresponding weight(s) may be applied when calculating the second score.

At 426, in response to determining that the first score is greater than the second score, the first orientation may be selected in association with the first portion. For example, a determination may be made that the first orientation of the first portion has a greater number of regions of interest than the second orientation of the first portion, and therefore also has a higher level of importance, interest and/or urgency than the second orientation. Accordingly, an indication that the first orientation is a preferred and/or recommended orientation (e.g., over the second orientation and/or one or more other orientations) for the first portion of the video may be generated and/or stored in a video guidance database (e.g., for the user, for a group of users, for the public, etc.).

At 428, in response to receiving a request to view (e.g., at least some of) the multidirectional video (e.g., from one or more users of a video sharing platform), the indication of the first orientation (e.g., being the preferred and/or recommended orientation) as a representation of the first portion and/or the indication of the second orientation (e.g., being the preferred and/or recommended orientation) as a representation of the second portion may be provided (e.g., to a device of the user).

Figure 4C:
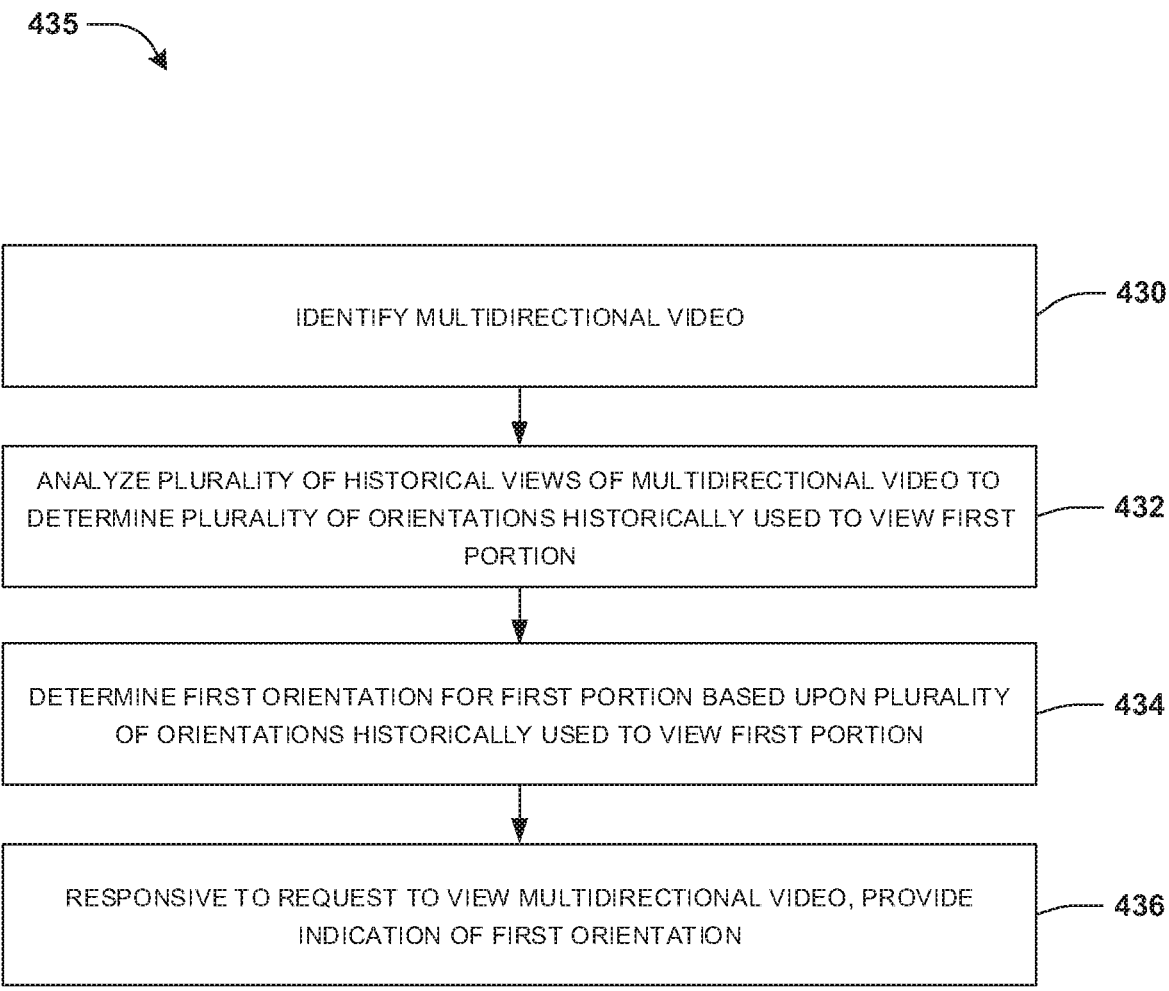
FIG. 4C is a flow chart illustrating an example method for selective orientation during presentation of a multidirectional video.

An embodiment of selective orientation during presentation of a multidirectional (e.g., 360-degree, spherical, immersive, etc.) video is illustrated by an example method 435 of FIG. 4C. A user, such as user Jill, (e.g., and/or a device associated with the user) may access and/or interact with a website, an application, etc. that provides a platform for uploading videos to a server (e.g., of the website, the application, etc.). The server may host uploaded videos, and the website may provide access to view the uploaded videos to an audience.

Accordingly, at 430, a video may be identified (e.g., by the server and/or by the user). The video may have been hosted by the server for a period of time, and may have been accessed and/or viewed by one or more users over the period of time. One or more portions of the video may have one or more corresponding orientations (e.g., through which respective portions of the video may be viewed at any given moment). For example, a first portion of the video may have a first orientation (e.g., focusing on a left area) at a first time (e.g., corresponding to a first timestamp, such as 28 minutes and 15 seconds after the start of the video), and the first portion may have one or more other orientations (e.g., focusing on a right area, an upper area, a lower area, etc.) at the (same) first time.

Historical views of the video and/or interactions of users with the video may be tracked and/or stored in a historical view database of the website. The historical view database may include, for example, a record of one or more times when a first user watched the video, a record of one or more orientations that the first user used to view each portion of the video, a record of one or more times when a second user watched the video, a record of one or more orientations the second user used to view each portion of the video, etc.

At 432, the historical views of the multidirectional video (e.g., by various users) may be analyzed to determine the plurality of orientations that were historically used to view a first portion of the multidirectional video. For example, a determination may be made that a first number of users viewed the first portion of the video via the first (e.g., left) orientation, a second number of users viewed the first portion of the video via a second (e.g., right) orientation, a third number of users viewed the first portion of the video via a third (e.g., lower) orientation, etc. Alternatively and/or additionally, orientations may be predicted (e.g., if historical views are not available for the video) based upon the behavior of one or more users with one or more other videos.

At 434, an orientation may be determined for the first portion of the multidimensional video based upon the plurality of orientations that were historically used to view the first portion. For example, one or more measurements (e.g., offset (e.g., distance, direction, etc.) from a center orientation) corresponding to plurality of orientations may be used (e.g., applied to a function, averaged, etc.) to calculate the orientation. Alternatively and/or additionally, the orientation may be determined (e.g., selected from a plurality of orientations) based upon a determination that a proportion of the orientation in the plurality of orientations exceeds one or more proportions of one or more other orientations in the plurality of orientations. For example, the orientation may be selected in response to determining that the orientation was historically used to view the first portion of the multidimensional video more than (e.g., any) other orientations.

The orientation may be selected in association with the first portion. For example, a determination may be made that the orientation of the first portion probably has a greater number of regions of interest than one or more other orientations of the first portion, and therefore also has a higher level of importance, interest and/or urgency than the second orientation (e.g., since most users viewed the first portion via the orientation). Accordingly, an indication that the orientation is a preferred and/or recommended orientation (e.g., over the second orientation and/or one or more other orientations) for the first portion of the video may be generated and/or stored in a video guidance database (e.g., for the user, for a group of users, for the public, etc.).

At 436, in response to receiving a request to view (e.g., at least some of) the multidirectional video (e.g., from a user of a video sharing platform), the indication of the orientation (e.g., being the preferred and/or recommended orientation) as a representation of the first portion may be provided (e.g., to a device of the user).

Figure 4D:
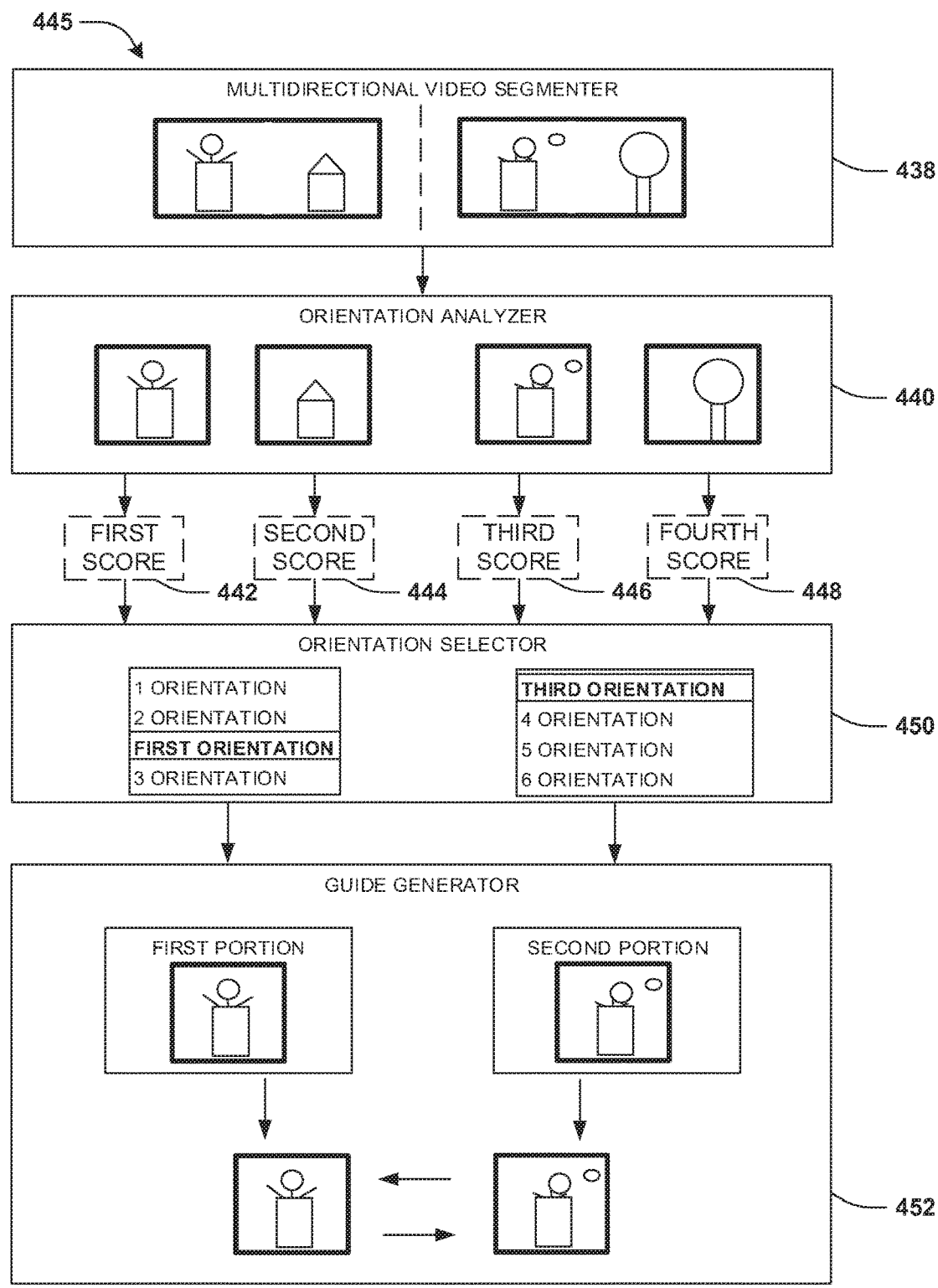
FIG. 4D is a component block diagram illustrating an example system for selective orientation during presentation of a multidirectional video.

FIG. 4D illustrates an example of a system 445 for selective orientation during presentation of a multidirectional video. Multidirectional video segmenter 438 may segment a video into one or more portions, such as a first portion and a second portion. Orientation analyzer 440 may analyze a first orientation of the first portion to determine a first score 442, a second orientation of the first portion to determine a second score 444, a third orientation of the second portion to determine a third score 446 and/or a fourth orientation of the second portion to determine a fourth score 448.

Orientation selector 450 may select the first orientation from a plurality of orientations (e.g., the first orientation, the second orientation, etc.) in association with the first portion based upon a comparison of the first score 442 and the second score 444 (e.g., and/or one or more other scores corresponding to one or more other orientations of the first portion). For example, the orientation with the largest score may be selected. In another embodiment, the orientation with the least deviation from one or more orientations of one or more portions preceding and/or following the first portion may be selected in association with the first portion.

Orientation selector 450 may select the third orientation from a plurality of orientations (e.g., the third orientation, the fourth orientation, etc.) in association with the second portion based upon a comparison of the third score 446 and the fourth score 448 (e.g., and/or one or more other scores corresponding to one or more other orientations of the second portion). For example, the orientation with the largest score may be selected. In another embodiment, the orientation with the least deviation from one or more orientations of one or more portions preceding and/or following the second portion may be selected in association with the second portion.

In some examples, the scores may be determined based upon one or more emotions and/or moods of one or more objects (e.g., people, animals, etc.) identified for the corresponding orientations in each portion. For example, the first score 442 may be determined based upon a first emotion (e.g., happiness) of a first object identified for the first orientation of the first portion, the second score 444 may be determined based upon a second emotion (e.g., anger) of a second object identified for the second orientation of the first portion, the third score 446 may be determined based upon a third emotion (e.g., sadness) of a third object identified for the third orientation of the second portion and/or the fourth score 448 may be determined based upon a fourth emotion (e.g., excitement) of a fourth object identified for the fourth orientation of the second portion.

One or more of the emotions may be determined based upon a facial expression and/or physical expression of the corresponding object. For example, the first emotion may be determined based upon a smile identified on a face of the first object (e.g., a first person), the second emotion may be determined based upon a frown identified on a face of the second object (e.g., a dog), the third emotion may be determined based upon tears identified on a face of the third object (e.g., a robot), and/or the fourth emotion may be determined based upon a jumping gesture identified on in the body of the fourth object (e.g., a second person).

In some examples, the scores may be determined based upon one or more costs associated with one or more objects (e.g., people, animals, etc.) identified for the corresponding orientations in each portion. For example, the first score 442 may be determined based upon a first cost (e.g., $5) of a first object (e.g., a cup of coffee) identified for the first orientation of the first portion, the second score 444 may be determined based upon a second cost (e.g., $20,000) of a second object (e.g., a car) identified for the second orientation of the first portion, the third score 446 may be determined based upon a third cost (e.g., $150,000) of a third object (e.g., a house) identified for the third orientation of the second portion and/or the fourth score 448 may be determined based upon a fourth cost (e.g., $5 million) of a fourth object (e.g., airplane) identified for the fourth orientation of the second portion.

It may be appreciated that one or more of the costs may be retrieved from a database storing information about the costs of various objects, may be estimated based upon a query performed using a search engine, and/or may be based upon a context of the corresponding object. For example, the context of an object may be correspond to objects and/or scenery surrounding the object within the video, and/or may be based upon a year of (e.g., depicted in) the video (e.g., such that a cell phone in a video depicting 1990 may be estimated to have a higher cost than a cell phone in a video depicting 2016).

Guide generator 452 may generate a guide for presentation of the video using one or more recommended and/or preferred orientations. For example, the guide may include indications of one or more orientations selected by the orientation selector 450 for each portion of the video. The guide may be implemented for one or more users viewing the video, and may recommend and/or automatically adjust to an orientation for one or more portions of the video.

Figure 4E:
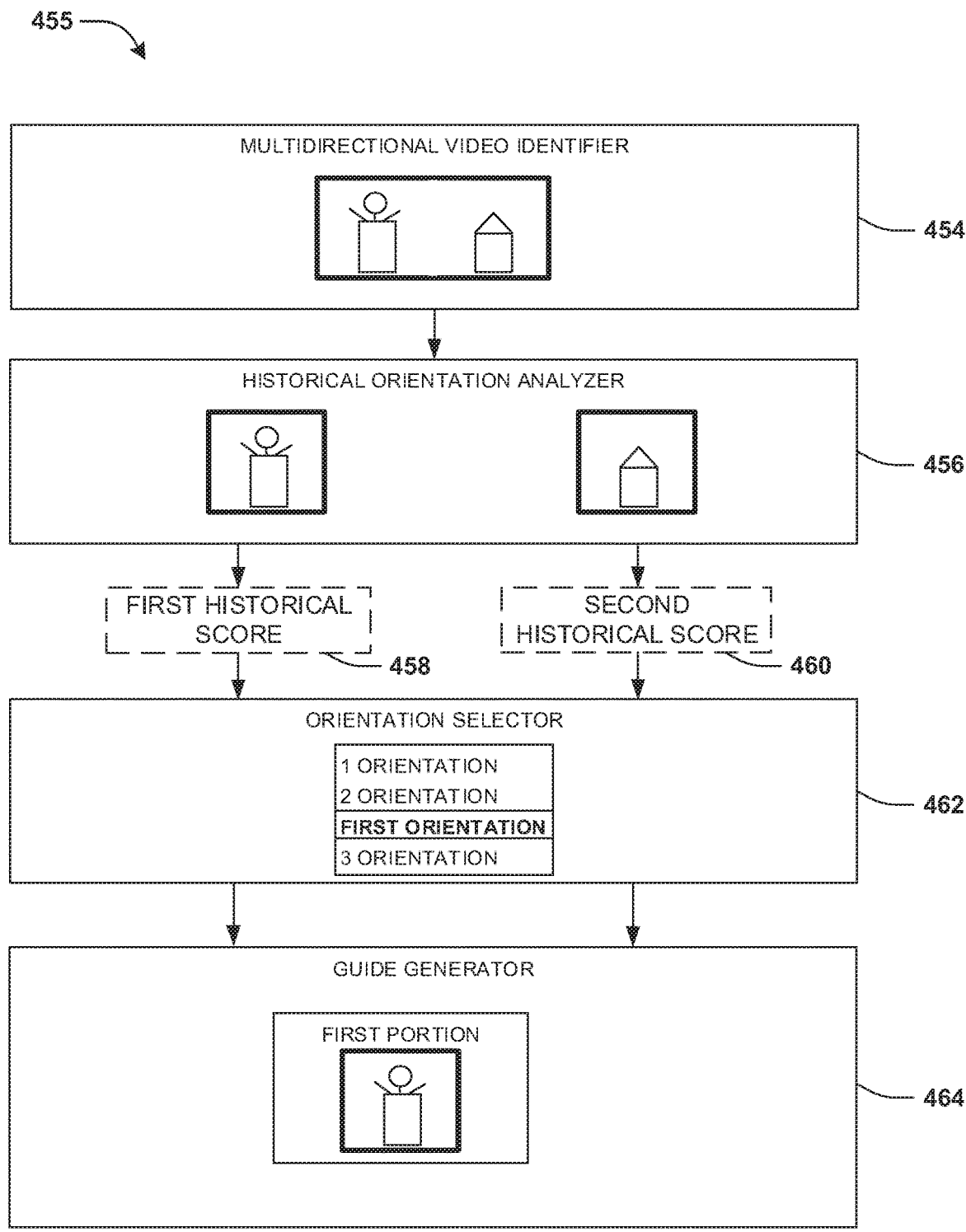
FIG. 4E is a component block diagram illustrating an example system for selective orientation during presentation of a multidirectional video.

FIG. 4E illustrates an example of a system 455 for selective orientation during presentation of a multidirectional video. Multidirectional video identifier 454 may identify a video. For example, the video may be (e.g., manually) selected by an administrator and/or one or more users of a website, and/or may be (e.g., automatically) identified based upon a determination that more than one directions (e.g., and/or orientations) are associated with (e.g., captured within) the video.

Historical orientation analyzer 456 may analyze a plurality of historical views (e.g., by one or more users) of the video to determine a plurality of orientations historically used to view a first portion of the multidirectional video. For example, the historical orientation analyzer 456 may analyze historical views of the video via a first orientation of the first portion to determine a first score 458 and/or historical views of the video via a second orientation of the first portion to determine a second score 460. For example, the first score 458 may be based upon a number and/or proportion of historical views of the video that used the first orientation to view the first portion of the video, and/or the second score 460 may be based upon a number and/or proportion of historical views of the video that used the second orientation to view the first portion of the video.

Orientation selector 462 may select the first orientation from a plurality of orientations (e.g., the first orientation, the second orientation, etc.) in association with the first portion based upon a comparison of the first score 458 and the second score 460 (e.g., and/or one or more other scores corresponding to one or more other orientations of the first portion). For example, the orientation with the largest score may be selected. In another embodiment, the orientation with the least deviation from one or more orientations of one or more portions preceding and/or following the first portion may be selected in association with the first portion.

Guide generator 464 may generate a guide for presentation of the video using one or more recommended and/or preferred orientations. For example, the guide may include indications of one or more orientations selected by the orientation selector 462 for one or more portions of the video. The guide may be implemented for one or more users viewing the video, and may recommend and/or automatically adjust to an orientation for one or more portions of the video.

In some examples, one or more users may be determined to have used (e.g., historical) orientations in one or more historical views that are more than a threshold amount different than the one or more orientations selected for the respective portions of the video, and notifications may be provided to the one or more users. For example, based upon a history of a second user, a determination may be made that the second user viewed (e.g., at a previous date) the first portion of the video with the second orientation rather than the first orientation. Accordingly, the second user (e.g., and one or more other users who similarly may be determined to have viewed the first portion of the video with an orientation different than the first orientation) may be provided with a notification recommending they re-watch the video (e.g., with the guide) for an improved experience. In some examples, users are selected for such notification based upon a determination that the users viewed more than a threshold number and/or proportion of portions of the video with orientations different than the recommended and/or preferred orientations.

Figure 5A:
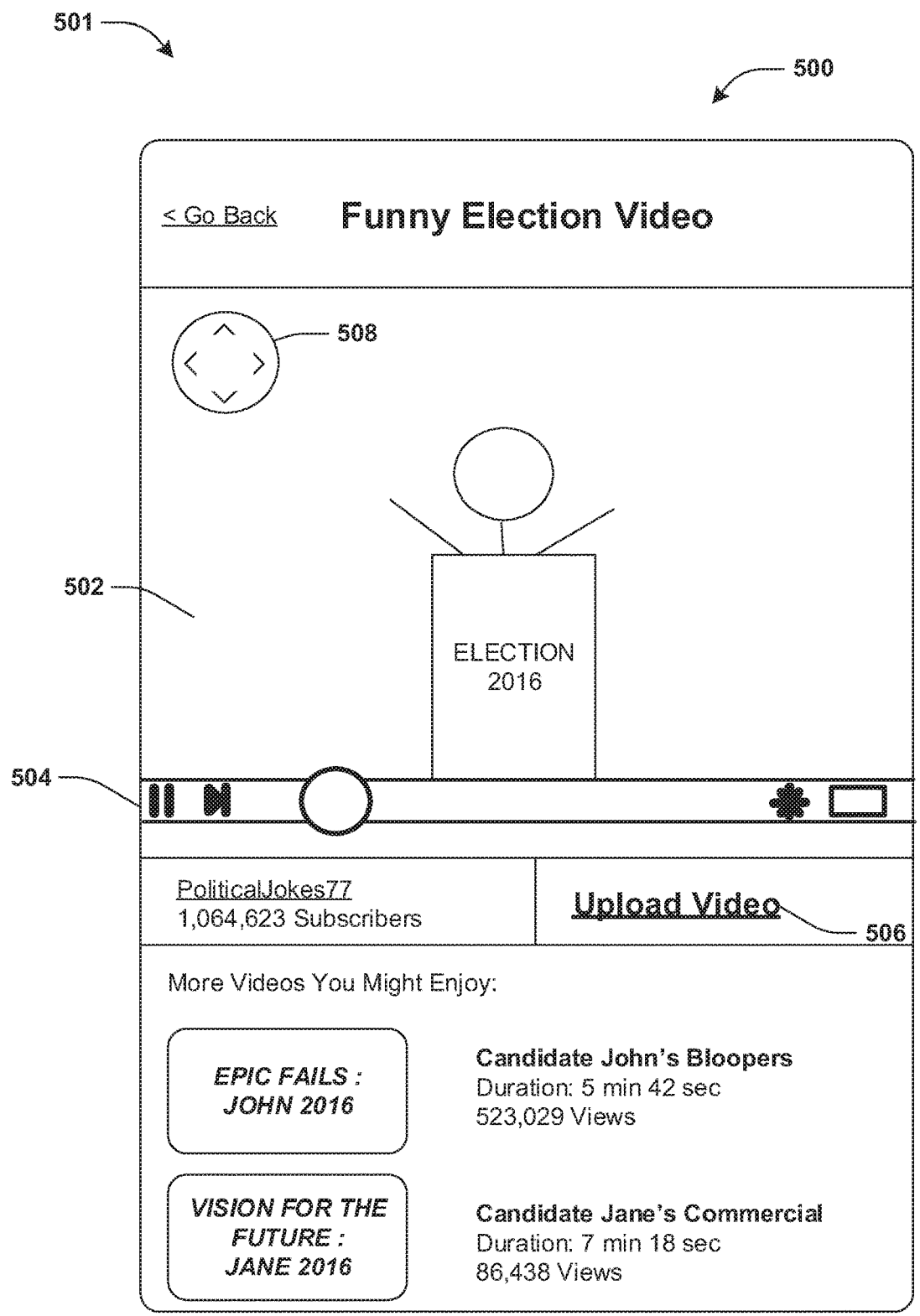
FIG. 5A is a component block diagram illustrating an example system for selective orientation during presentation of a multidirectional video.

FIGS. 5A-5E illustrate examples of a system 501 for selective orientation during presentation of a multidirectional video. FIG. 5A illustrates an interface 500 that may be displayed on a device of a user. The interface 500 may, in some examples, display an application, such as a video player, on the interface, which may include a video display portion 502 within which a video may be played, a video control bar 504, information about a source of the video, a control that when selected enables sharing the video, and/or one or more other recommended videos. The interface 500 may further display a video upload button 506, which may be selected by the user to upload one or more videos to a server associated with the application, and/or a display control 508, which may be used to adjust an area of the video displayed in the video display portion 502.

Figure 5B:
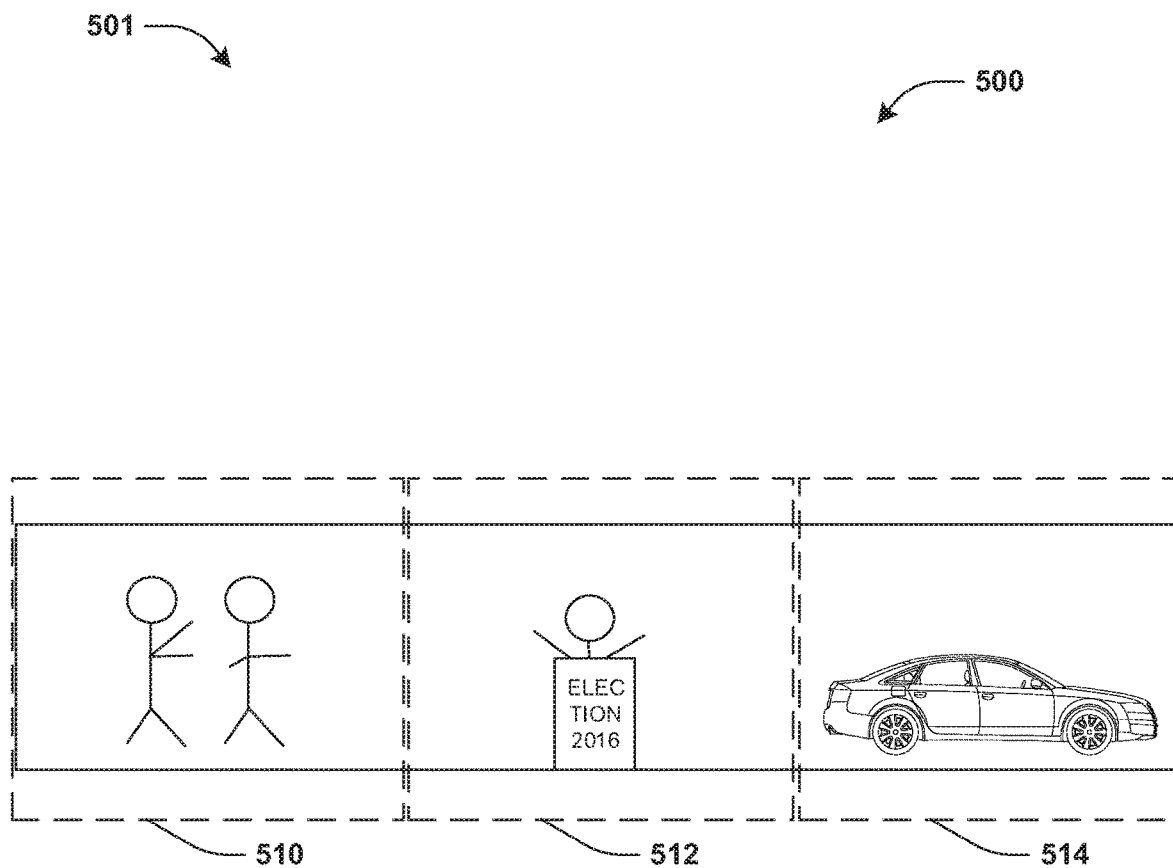
FIG. 5B is a component block diagram illustrating an example system for selective orientation during presentation of a multidirectional video.

FIG. 5B illustrates a backend of the interface 500 that may process one or more areas of a (e.g., single) portion of the video being played in the video display portion 502. For example, in the portion (e.g., at a single time), the video display portion 502 may be capable of (e.g., selectively) displaying a first area 510, a second area 512 and/or a third area 514.

Figure 5C:
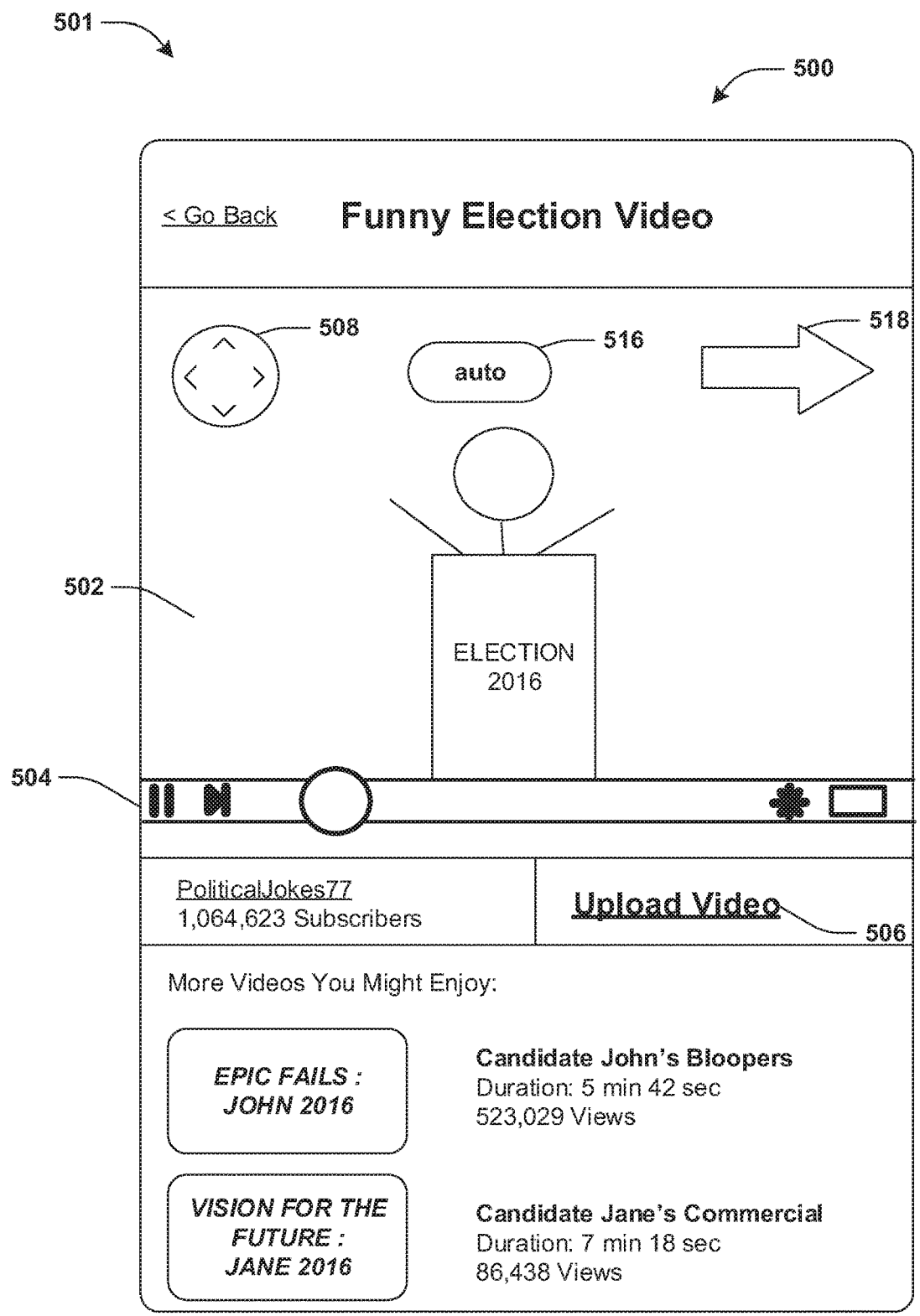
FIG. 5C is a component block diagram illustrating an example system for selective orientation during presentation of a multidirectional video.

FIG. 5C illustrates an embodiment of the interface 500 that may be displayed on the device of the user. Here, the interface 500 may display an auto orientation button 516 that, when selected, may automatically present one or more preferred and/or recommended orientations while playing the video. The interface 500 may display a guide 518 (e.g., an arrow) indicating which direction corresponds to a recommended orientation in the instant (e.g., or an upcoming) portion of the video (e.g. so that the user may use the control 508 to (e.g., manually) adjust an active orientation of the video). For example, the guide 518 may point to the right to indicate that an orientation that displays the third area 514 is recommended and/or preferred (e.g., based upon a determination that the car identified in the third area 514 is associated with a higher score than the people identified in the first area 510 and/or the person identified in the second area 512).

Figure 5D:
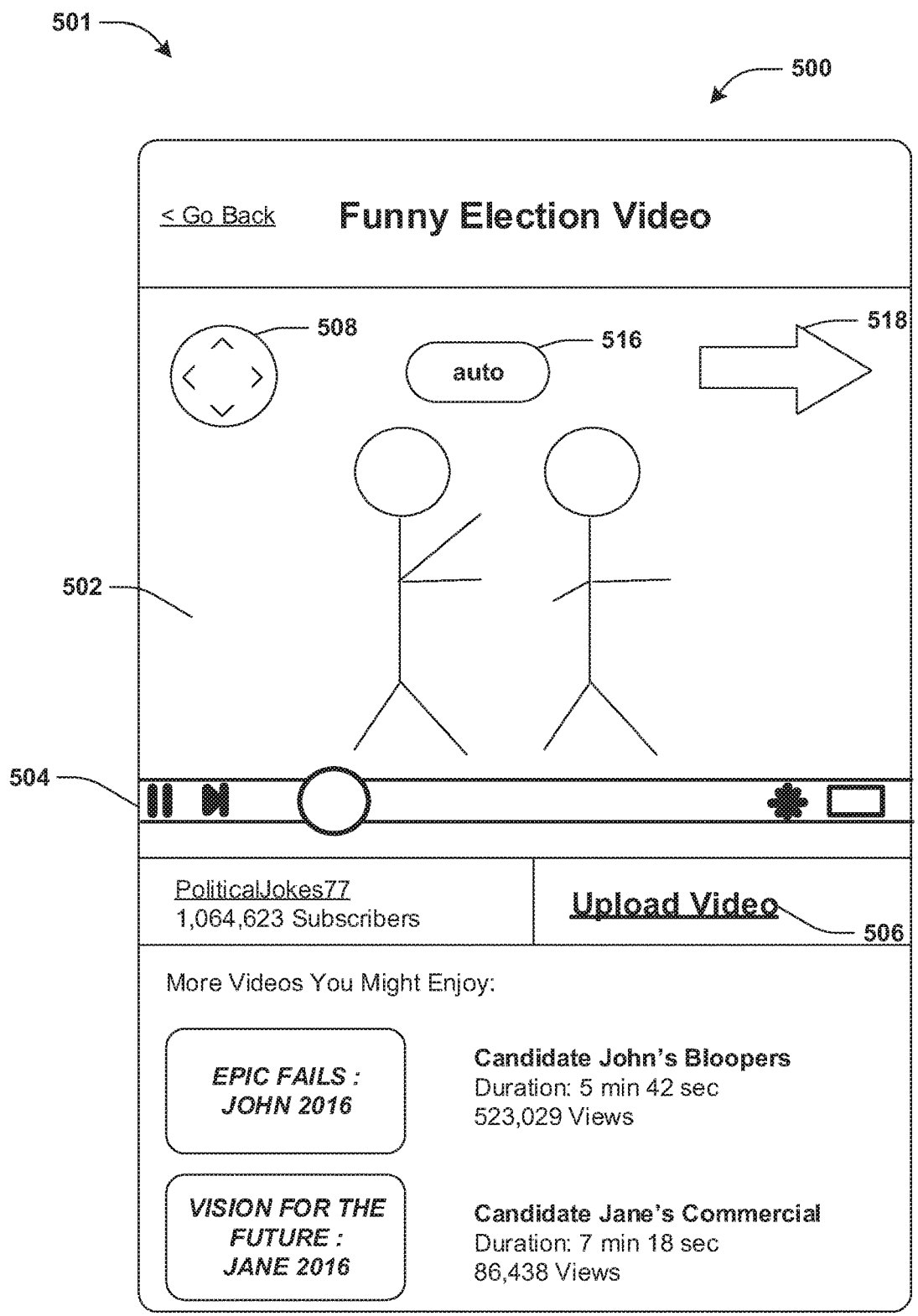
FIG. 5D is a component block diagram illustrating an example system for selective orientation during presentation of a multidirectional video.

However, the user may use the control 508 to adjust the active orientation of the video to the left instead. Accordingly, FIG. 5D illustrates the interface 500 displaying the first area 510 via a second (e.g., not recommended) orientation.

Figure 5E:
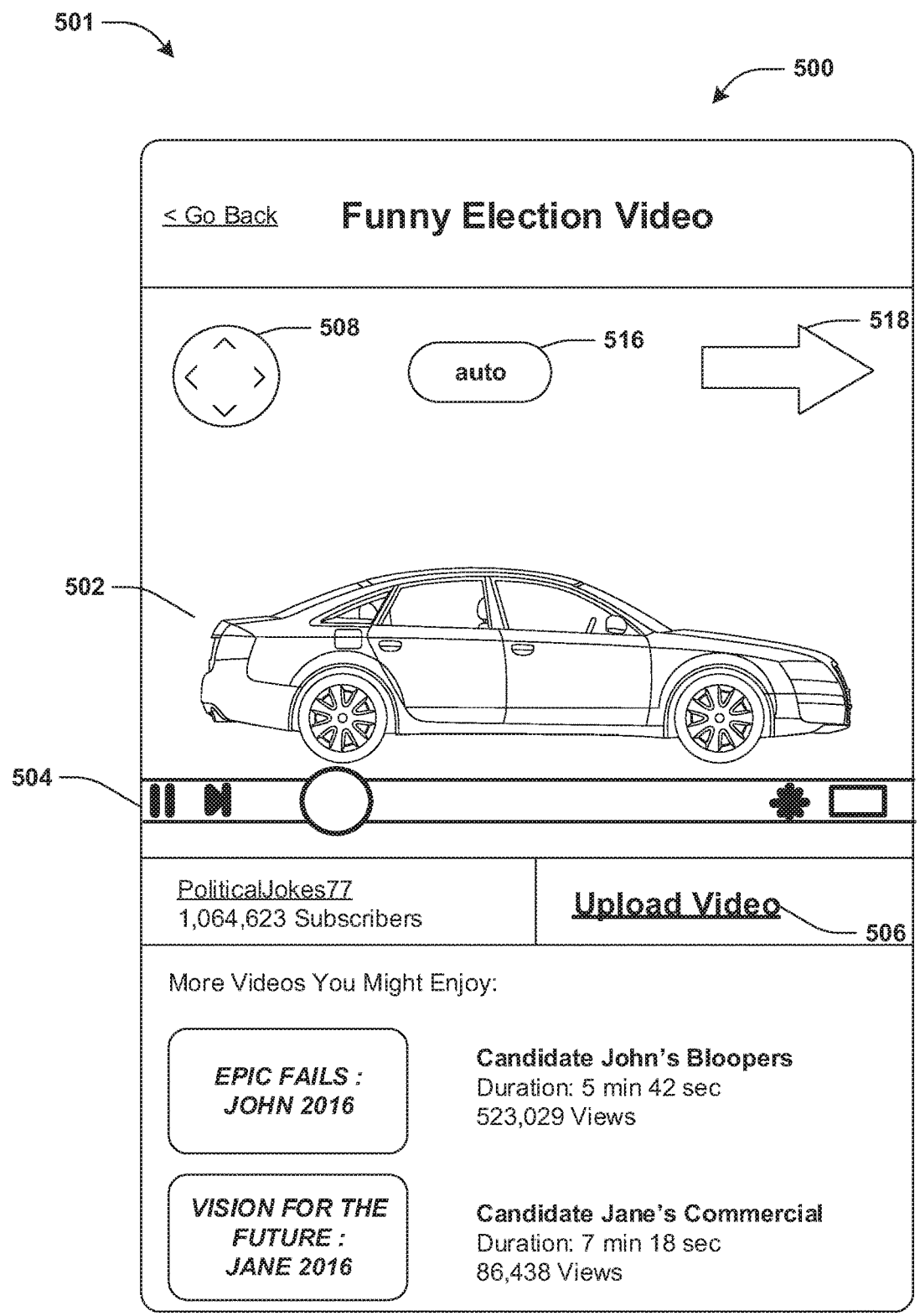
FIG. 5E is a component block diagram illustrating an example system for selective orientation during presentation of a multidirectional video.

Alternatively and/or additionally, the user may select the auto orientation button 516. Accordingly, FIG. 5E illustrates the interface 500 displaying the third area 514 via the orientation recommended for the instant portion. In some examples, the automatic orientation mechanism implemented by (e.g., manual) selection of the auto orientation button 516 may (e.g., automatically) be activated when a difference between the score of a preferred and/or recommended orientation and one or more other orientations exceeds a (e.g., defined) threshold.

In some examples, at least some of the disclosed subject matter may be implemented on a client (e.g., a device of a user), and in some examples, at least some of the disclosed subject matter may be implemented on a server (e.g., hosting a service accessible via a network, such as the Internet).

Figure 6:
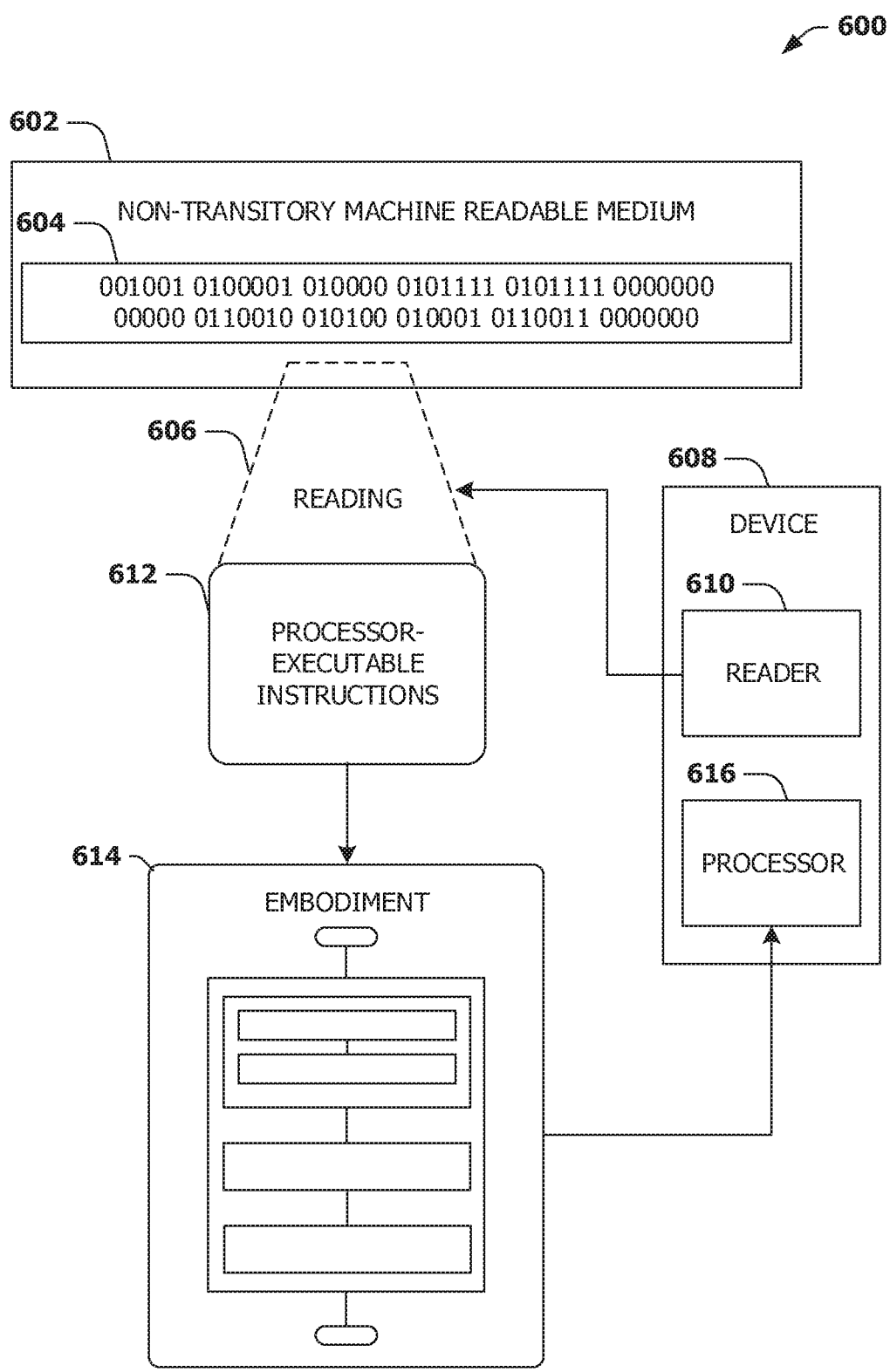
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance and/or implementation of an embodiment 614, such as at least some of the example method 400 of FIG. 4A, the example method 425 of FIG. 4B, the example method 435 of FIG. 4C, the example system 445 of FIG. 4D, the example system 455 of FIG. 4E and/or the example system 501 of FIGS. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for selective orientation during presentation of a multidirectional video, comprising:
    receiving a multidirectional video;
    segmenting the multidirectional video into at least a first portion and a second portion;
    analyzing a first orientation of the first portion to determine a first score;
    analyzing a second orientation of the first portion to determine a second score;
    responsive to determining that the first score is greater than the second score, selecting the first orientation, but not the second orientation, in association with the first portion;
    analyzing a third orientation of the second portion to determine a third score;
    analyzing a fourth orientation of the second portion to determine a fourth score;
    responsive to determining that the third score is greater than the fourth score, selecting the third orientation, but not the fourth orientation, in association with the second portion; and
    responsive to determining that one or more differences between one or more historical orientations, used in one or more historical views of at least some of the multidirectional video by one or more users, and at least one of the first orientation or the third orientation exceed a threshold, providing one or more notifications to the one or more users.

2. The method of claim 1, wherein at least one of:
    the determining the first score is based upon a first number of objects identified for the first orientation of the first portion;
    the determining the second score is based upon a second number of objects identified for the second orientation of the first portion;
    the determining the third score is based upon a third number of objects identified for the third orientation of the second portion; or
    the determining the fourth score is based upon a fourth number of objects identified for the fourth orientation of the second portion.

3. The method of claim 1, wherein at least one of:
    the determining the first score is based upon a first object score determined for a first object identified for the first orientation of the first portion;
    the determining the second score is based upon a second object score determined for a second object identified for the second orientation of the first portion;
    the determining the third score is based upon a third object score determined for a third object identified for the third orientation of the second portion; or
    the determining the fourth score is based upon a fourth object score determined for a fourth object identified for the fourth orientation of the second portion.

4. The method of claim 3, wherein at least one of the first object score, the second object score, the third object score or the fourth object score is determined based upon one or more weights associated with one or more objects.

5. The method of claim 3, wherein at least one of:
    the first object score is determined based upon a first emotion of the first object;
    the second object score is determined based upon a second emotion of the second object;
    the third object score is determined based upon a third emotion of the third object; or
    the fourth object score is determined based upon a fourth emotion of the fourth object.

6. The method of claim 5, wherein at least one of the first emotion, the second emotion, the third emotion or the fourth emotion is determined based upon one or more facial expressions associated with one or more objects.

7. The method of claim 2, wherein at least one of the first number of objects, the second number of objects, the third number of objects or the fourth number of objects is identified using image processing.

8. The method of claim 3, wherein at least one of the first object, the second object, the third object or the fourth object is identified using image processing.

9. The method of claim 1, comprising:
    storing an indication of the first orientation as a representation of the first portion and an indication of the third orientation as a representation of the second portion in a database.

10. The method of claim 9, comprising:
    responsive to receiving a request to view the multidirectional video, providing the indication of the first orientation as the representation of the first portion and the indication of the third orientation as the representation of the second portion; and
    responsive to receiving a second request to view the multidirectional video, retrieving from the database the indication of the first orientation as the representation of the first portion and the indication of the third orientation as the representation of the second portion.

11. The method of claim 3, wherein at least one of the first object score, the second object score, the third object score or the fourth object score is determined based upon one or more estimated costs.

12. The method of claim 1, wherein:
    the first portion starts at a first time of the multidirectional video and ends at a second time of the multidirectional video; and the second portion starts at a third time of the multidirectional video and ends at a fourth time of the multidirectional video.

13. The method of claim 12, comprising:
determining a first transition movement from the first orientation to the third orientation.

14. The method of claim 13, comprising responsive to receiving a request to view the multidirectional video:
providing an indication of the first orientation as a representation of the first portion and an indication of the third orientation as a representation of the second portion; and
providing an indication of the first transition movement.

15. A computing device comprising:
a processor; and
memory comprising processor-executable instructions that when executed by the processor cause performance of operations, the operations comprising:
receiving a multidirectional video;
analyzing a first orientation of a portion of the multidirectional video to determine a first score;
analyzing a second orientation of the portion of the multidirectional video to determine a second score;
responsive to determining that the first score is greater than the second score, selecting the first orientation, but not the second orientation, in association with the portion of the multidirectional video; and
responsive to determining that one or more differences between one or more historical orientations, used in one or more historical views of at least some of the multidirectional video by one or more users, and the first orientation exceed a threshold, providing one or more notifications to the one or more users.

16. The computing device of claim 15, the operations comprising:
generating a guide for selective orientation during presentation of the multidirectional video based upon a combination of an indication of the first orientation as a representation of the portion of the multidirectional video and an indication of a third orientation as a representation of a second portion of the multidirectional video.

17. A non-transitory machine readable medium having stored thereon processor-executable instructions that when executed cause performance of operations, the operations comprising:
identifying a multidirectional video;
analyzing a plurality of historical views of the multidirectional video to determine a plurality of orientations historically used to view a portion of the multidirectional video;
determining an orientation for the portion of the multidirectional video based upon the plurality of orientations; and
responsive to determining that one or more differences between one or more historical orientations, used in one or more historical views of at least some of the multidirectional video by one or more users, and the orientation exceed a threshold, providing one or more notifications to the one or more users.

18. The non-transitory machine readable medium of claim 17, wherein:
the orientation is determined based upon an average of the plurality of orientations historically used to view the portion of the multidirectional video.

19. The non-transitory machine readable medium of claim 17, wherein:
the orientation is determined based upon a determination that a proportion of the orientation in the plurality of orientations exceeds one or more proportions of one or more other orientations in the plurality of orientations.

20. The non-transitory machine readable medium of claim 17, comprising:
responsive to receiving a request to view the multidirectional video, providing an indication of the orientation as a representation of the portion of the multidirectional video.

* * * * *